Patented Apr. 9, 1946

2,398,173

UNITED STATES PATENT OFFICE 2,398,173

LITHIUM SOAP GREASES

Lawrence C. Brunstrum, Chicago, Ill., and Hubert J. Liehe, Hammond, Ind., assignors to Standard Oil Company, Chicago, Ill., a corporation of Indiana No Drawing. Application January 29, 1944, Serial No. 520,304

21 Claims. (Cl. 252—42.1)

This invention relates to novel and improved lubricants and processes for the preparation thereof. More particularly it relates to novel and improved lithium soap greases and novel methods for their manufacture.

Lithium soap greases are valued for their resistance to water, great chemical stability and their relatively small change in the consistency over a wide temperature range. However, their production and use have been hampered by their lack of homogeneity. It is true that smooth and homogeneous lithium soap greases can be prepared containing relatively low proportions of lithium soaps; thus lithium soap greases containing up to about 5% by weight of lithium soaps can be prepared as smooth, homogeneous products.

However, for many purposes it is desirable to use lithium greases containing in excess of 5%, e. g. 6, 7, 8% and in many instances at least 10% of lithium soap, for example, 15, 20 and 25% by weight of the lithium soap. We have found that lithium soap greases containing in excess of 5%, especially in excess of about 10%, by weight of lithium soap are, in general, characterized by lack of uniformity in working. Especially is this true of greases containing lithium soaps of the higher saturated fatty acids.

Ordinarily, lithium soap greases are made by charging a lithium soap to a grease kettle provided with an agitator, such as a paddle stirrer, adding the bulk of the hydrocarbon oil and heating to a temperature in the range of about 400 to about 440° F., with stirring, to prepare a homogeneous composite which is then withdrawn into pans where it is allowed to cool slowly to the ambient temperature. Relatively low amounts of soap (5–6%) produce fair grease, but a soap content in the range necessary to avoid oil leakage produces hard, oily gels which are not satisfactorily homogenized. In order to produce a grease of smooth and homogeneous structure, some type of homogenization or milling of the grease is essential.

Homogenization or milling of greases of lithium soap content in excess of about 5% generally requires costly special equipment and is frequently attended by the disadvantages of excessive power and time requirements. Despite numerous precautionary measures in manufacture the milled lithium greases are generally not homogeneous and smooth and may exhibit distressingly high oil losses in service.

Lithium greases containing 5% or more of a lithium soap, particularly 10% or more and especially of a lithium soap of a higher saturated fatty acid cannot generally be milled satisfactorily in conventional mixers, such as paddle mixers, buhr stone mills or the like. It has heretofore been necessary to adopt special mixers or homogenizers, such as the Cornell homogenizer. In the Cornell homogenizer, grease is forced onto the central portion of the under surface of a disc driven at high speed, generally 900 to 1800 R. P. M., whence it is driven by centrifugal force and the pressure of added grease to the periphery of the under surface of the disc and discharged via a conduit from the homogenizer. The homogenizer disc is enclosed in a housing wherein the desired degree of vacuum may be maintained.

It is an object of this invention to provide lubricating greases containing a high proportion of a lithium soap and characterized by a smooth and homogeneous structure. Another object of this invention is to provide greases containing a high proportion of lithium soaps and distinguished by exceedingly low tendency toward oil leakage in use. Yet another object of this invention is to provide greases containing at least 5%, preferably 10% or more, by weight of a lithium soap of a higher saturated fatty acid and distinguished by smooth and homogeneous structure and low tendency to leak oil. An additional object of this invention is to provide improved processes for the homogenization or milling of lithium soap greases.

We have found that greases containing at least 5%, preferably 10% by weight or more, of a lithium soap and normally tending to form hard, oily gels can be compounded with esters of polyhydric alcohols and acids, particularly partial esters, to produce smooth, homogeneous composites having high lubricating value. These esters form a permanent component of the greases of our invention and do not separate therefrom at low temperatures nor volatilize appreciably at high temperatures. We have also found that the addition of certain glycol esters to a composite of a lithium soap and a hydrocarbon oil containing in excess of 5%, preferably at least about 10% by weight of lithium soap, particularly a soap of the type of lithium stearate, renders possible the production of smooth lubricating greases, exhibiting low oil loss by leakage in service. Our invention is especially applicable to greases containing lithium soaps of the higher saturated fatty acids, by which we mean lauric, myristic, palmitic, margaric, stearic, arachidic, behenic acids and the like. We may also use lithium soaps of mixtures of saturated fatty acids such as hydrogenated fish oil fatty acids.

Suitable polyhydric alcohols whose esters, particularly partial esters, are suitable for the purposes of our invention include ethylene glycol, polyethylene glycols, propylene glycol, butylene glycols, amylene glycols, glycols of higher olefins such as are obtainable by high-temperature cracking of petroleum waxes in the vapor phase, glycerol, pentaerythritol, mannitols, mannitans, mannides, sorbitols, sorbitans, sorbides, and the like.

A variety of acids or other compounds capable of introducing the desired acid radical can be esterified with polyhydric alcohols to produce esters suitable for the purposes of our invention. We may use either pure or mixed esters. These acids may be carboxylic acids, sulfonic acids, and even in some instances, inorganic acids, but we prefer to use esters of carboxylic acids, especially fatty acids. Suitable carboxylic acids include the fatty acids, especially the higher fatty acids, such as lauric, myristic, margaric, oleic, palmitic, stearic, arachidic, behenic acids and the like; naphthenic acids, particularly mixed naphthenic acids such as are obtainable from various petroleum sources; aromatic carboxylic acids; alkylaromatic carboxylic acids arylated alkyl carboxylic acids, e. g. phenylstearic acid, and the like.

Suitable sulfonic acids include alkyl, aryl and alicyclic sulfonic acids and derivatives thereof, particularly petroleum sulfonic acids obtained by treating various petroleum fractions with strong, generally fuming, sulfuric acid. We may use either preferentially water-soluble petroleum sulfonic acids, known as green acids, or preferentially oil-soluble petroleum sulfonic acids, known as mahogany acids, but prefer the latter. Organic sulfuric acids, e. g. lauryl sulfuric acid obtained by sulfuric acid treatment of alcohols derived from cocoanut oil by catalytic hydrogenation, may be esterified with glycols to produce esters which we may use in lithium soap greases.

Suitable esters for our purposes include esters of an acid and a glycol having the general formula

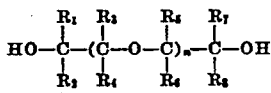

wherein $R_1$ to $R_8$ are either the same or different and selected from the group consisting of hydrogen and alkyl radicals, such as methyl, ethyl, propyl, butyl and amyl radicals and $n$ is an integer having a value between 0 and 5, although higher values of $n$ are sometimes not objectionable. Particularly suitable for the purposes of our invention are esters of glycols having the above general formula wherein $n$ is unity.

Specifically we have found that esters of diethylene glycol which has the formula

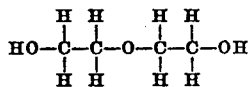

are particularly valuable as addition agents in greases comprising a high proportion of lithium soap, especially a lithium soap of a higher saturated fatty acid. We may also use esters of tri-, tetra-, penta- and hexa-ethylene glycols. Also, we may use mixtures of esters of different glycols with one acid or of different acids with one glycol.

Extremely desirable lithium greases of high soap content can be made by introducing stearates of diethylene glycol, e. g. commercial diglycol stearates, therein during the course of manufacture. Commercial diglycol stearates apparently consist of about 80% of diethylene glycol distearate, 15% of diethylene glycol monostearate, about 4% of monoethylene glycol monostearate, about 1% of monoethylene glycol distearate and a trace of water. Commercial diglycol stearates are normally made from commercial "stearic acid" consisting of about 60% palmitic acid and 40% stearic acid.

It is necessary to provide careful control of the proportion of ester incorporated in lithium greases of high soap content, i. e. greases containing in excess of 5%, especially about 10% or more, of lithium soap. The addition of an insufficient amount of ester to composites of a lithium soap and oil fails to change the undesirable hard gel structure normally encountered in high soap content lithium greases; furthermore homogenization of the lithium grease requires excessive power and time expenditures and necessitates the use of costly special equipment. The addition of an excess of a partial ester of a polyhydric alcohol and an acid to composites of lithium soap and oil results in the production of a soft, murky grease which may have a tendency toward high oil leakage in service. The addition of about 0.2 to about 2% by weight of the esters of our invention to lithium soap greases of high soap content generally produces the most satisfactory results. It will be appreciated, however, that some variation in the optimum content of the ester may be necessitated by the nature of the particular ester chosen for use, the particular lithium soap used in the grease, the exact proportion of the lithium soap in the grease, the nature of the hydrocarbon oil used, and the specific properties desired in the particular grease under consideration.

The ester to be used may be incorporated in the lithium soap grease at one of a variety of stages in the normal course of the grease manufacture. It may be added with the initial batch of oil or lithium soap to the grease kettle, or preferably to the composite of lithium soap and hydrocarbon oil in the grease kettle after a temperature in the range of about 400 to about 440° F. has been attained.

In the manufacture of greases of high lithium soap content, particularly where a lithium soap of a higher saturated fatty acid is employed and wherein an ester of a polyhydric alcohol and an acid is added to the hot composite in the grease kettle, we have found that the rate of cooling the grease upon its withdrawal from the grease kettle exerts a profound effect upon the consistency of the finished grease. We have found that lithium soap greases of high soap content should preferably be cooled to about 200° F. at an average rate in excess of about 2° F. per minute, and better in excess of about 4° F. per minute, without agitation to obtain greases of desirable consistency.

Highly desirable lithium soap greases may be prepared by using formulations within the following range:

| | Percent by weight |
|---|---|
| Lithium stearate | 5–40 |
| Ester of a polyhydric alcohol | 0.2–2.0 |
| Hydrocarbon oil (viscosity 50–600 S. S. U. 100° F.) | 60–90 |

Antioxidants may be added to the lithium soap greases of our invention. A particularly desirable antioxidant is phenyl-alpha-naphthylamine, which may be added in proportions of about 0.01 to about 1% by weight, based on the finished grease. In addition, we may add fillers such as talc or asbestos, solid lubricants such as graphite, dyes, odorant materials, metal deactivators, corrosion inhibiting compounds, etc.

An especially useful formula for a high soap content lithium grease is:

| | Percent by weight |
|---|---|
| Lithium stearate | 15.0 |
| Commercial diglycol stearate | 0.5 |
| Phenyl-alpha-naphthylamine | 0.15 |
| Hydrocarbon oil (viscosity 50–600 S. S. U. 100° F.) | 84.35 |

The following examples will serve to illustrate, but do not limit, our invention. Unless otherwise indicated, all parts are by weight. Penetration data are those obtained by the use of the equipment and procedure described in A. S. T. M. test D217-38T set forth in A. S. T. M. Standards (1942)—part III—pp. 910-914. The oil leakage test data were obtained by the use of the equipment and procedure described in U. S. Army-Navy Specification AN–G–3a of March 6, 1943, pp. 5 and 6.

*Example 1*

Commercial, neutral lithium stearate (14 parts) was placed in a grease kettle together with 61.7 parts of a hydrocarbon oil having a viscosity of 56 S. S. U. at 100° F. and 19.2 parts of a hydrocarbon oil having a viscosity of 138 S. S. U. at 100° F. and the stirrers and heaters started. At 335° F. some rather large masses of soap or thick grease were apparent. At 365° F. the batch appeared heavy and rough. At 390° F., 0.1 part of phenyl-alpha-naphthylamine was added in five parts of the first described hydrocarbon oil and the batch was allowed to cool with stirring. The finished grease was soft and unhomogeneous, being characterized by the presence of rough, hard agglomerates.

*Example 2*

A hydrocarbon oil having a viscosity of 65 seconds Saybolt Universal at 100° F. was mixed with 25% of commercial lithium stearate in a grease mixer and the mixture heated with stirring to a temperature in the range of 400–430° F. until the soap was completely dispersed in the oil. The mixture was then filled out into pans and allowed to cool to the ambient temperature. The unworked penetration of this grease was about 40 and the grease could not be satisfactorily homogenized.

*Example 3*

Commercial lithium stearate (Litholite "A") (2.25 parts) and 12.4 parts of a hydrocarbon oil having a viscosity of 65 S. S. U. at 100° F. were placed in a grease mixer and stirred cold for a short time. Heat was then applied to the kettle and when the temperature reached 210° F., 0.075 part of commercial diglycol stearate was added. At 375° F. the batch appeared quite dense. Phenyl-alpha-naphthylamine (0.023 part) dissolved in 0.25 part of the above hydrocarbon oil was graded in at 420° F., at which time the batch was practically all liquefied and clear. The temperature was maintained for a short time at 420° F. and the grease was then filled into water-cooled trays where it was allowed to cool in thin layers. Slow cooling, i. e. cooling at an average rate below about 2° F. per minute to about 200° F. yielded a soft grease requiring no further homogenization, having an unworked penetration of 312 and a worked penetration of 338. The grease was homogeneous and of smooth structure and exhibited highly desirable characteristics in lubricating ball bearings and the like at low temperatures, e. g. —60° F. Harder greases adapted for lubrication at higher temperatures can be produced by increasing the cooling rate of the grease to at least 2° F. per minute, preferably 4° F. per minute or even more, until the grease has been cooled to about 200° F., no agitation being effected during the cooling of the grease to 200° F.

*Example 4*

A batch of grease prepared in accordance with Example 3 was heated in a grease kettle to 425° F., with stirring, and 0.015 part of phenyl-alpha-naphthylamine in 0.11 part of hydrocarbon oil was added. When the temperature of the batch reached 430° F. the grease was withdrawn into water-cooled pans to cool in 1.25 inch layers. Air was circulated over the pans by a fan. The cooling rate data shown below were obtained. The product thus cooled has an unworked penetration of 135, as compared with the unworked penetration of 312 obtained in the slow-cooled grease of Example 3. In the following tabulation of cooling rate data, the time and temperature drop ($-\Delta T$) are given with respect to the starting time and temperature, which was 430° F. The final temperature for which data are given is 200° F. The rate of cooling of the grease below 200° F. does not appear to exert an appreciable effect on its ultimate consistency.

| Time (minutes) | $-\Delta T(°F.)$ | $-\Delta T$/minute |
|---|---|---|
| 5 | 60 | 12 |
| 11 | 105 | 9.5 |
| 15 | 130 | 8.7 |
| 20 | 150 | 7.5 |
| 26 | 185 | 7.1 |
| 32 | 208 | 6.5 |
| 39 | 230 | 5.9 |

*Example 5*

A grease was prepared as in Example 2, but formulated with 1% of commercial diglycol stearate. This grease was plastic and opaque and was found to have an unworked penetration of 128 and worked penetration of 228. It was a desirable low-temperature lubricant for ball-bearings, roller bearings and the like.

*Example 6*

A grease containing 13.25% by weight of commercial lithium stearate, 0.44% by weight of commercial diglycol stearate and 0.15% by weight of phenyl-alpha-naphthylamine was prepared, using a procedure similar to that outlined in Example 2. This grease was found to have an unworked penetration of 172, which increased to 280 on working. When tested for oil leakage, this grease showed 1.77% by weight loss. The percentage of oil lost by evaporation was 5.34, using the test described in paragraph F-5c (1) page 5 of U. S. Army-Navy Specification AN–G–3a (March 6, 1943).

*Example 7*

A grease as in Example 6, but containing glycerol mono-oleate in place of diglycol stearate, showed an unworked penetration of 160, worked penetration of 230, oil leakage loss of only 0.01% by weight and oil evaporation loss of 3.4% by weight.

*Example 8*

A solution of the following materials was made at 400° F. and cooled in a layer one inch thick:

| | Parts |
|---|---|
| Commercial lithium stearate (Litholite A) | 13 |
| Pentaerythritol mono-oleate | 1 |
| Hydrocarbon oil (viscosity 56 S. S. U. 100° F.) | 86 |

A grease of excellent structure and consistency was produced.

In certain instances the effects of partial esters of polyhydric alcohols and acids in lithium soap greases of high soap content may be improved by the addition of free naphthenic acids, petroleum sulfonic acids, phosphatides such as lecithin, cephalin or the like, naphthenic acid soaps, e. g. lead naphthenate, high boiling alcohols such as lauryl and cetyl alcohols, phosphorus- and sulfur-bearing organic compounds such as are described in U. S. Patent 2,316,082 and the like.

We claim:

1. A lithium soap grease comprising at least 5% of a lithium soap, a major proportion of a hydrocarbon oil and between about 0.2% and about 2% of an unsulfurized ester of a polyhydric alcohol and an acid.

2. A lithium soap grease comprising at least 5% of a lithium soap, a major proportion of a hydrocarbon oil and an unsulfurized ester of a polyhydric alcohol and an acid, said ester being present in quantity sufficient only to prevent the initial formation of a hard gel-like structure in the grease.

3. A lithium soap grease comprising at least 5% of a lithium soap, a major proportion of a hydrocarbon oil and a small proportion of a partial ester of a polyhydric alcohol and an acid sufficient to prevent the initial formation of a hard gel-like structure in the grease.

4. A lithium soap grease comprising at least 5% of a lithium soap, a major proportion of a hydrocarbon oil and between about 0.2% and about 2% of an unsulfurized ester of a polyhydric alcohol and a fatty acid.

5. A smooth, homogeneous grease comprising at least 5% of a lithium soap of a higher saturated fatty acid, a major proportion of a hydrocarbon oil and an unsulfurized ester of a polyhydric alcohol and an acid, said ester being present in quantity sufficient only to prevent the initial formation of a hard gel-like structure in the grease.

6. A smooth, homogeneous grease comprising at least 5% of a lithium soap, a major proportion of a hydrocarbon oil and between about 0.2% and about 2.0% of a partial ester of a polyhydric alcohol and an acid.

7. A smooth, homogeneous grease comprising at least 5% of a lithium soap, a major proportion of a hydrocarbon oil and between about 0.2% and about 2.0% of a partial ester of a polyhydric alcohol and a fatty acid.

8. A smooth, homogeneous grease comprising at least 5% of a lithium soap of a higher saturated fatty acid, a major proportion of a hydrocarbon oil and between about 0.2% and about 2.0% of an unsulfurized ester of a polyhydric alcohol and a fatty acid.

9. A smooth, homogeneous grease comprising at least 5% of a lithium soap, a major proportion of a hydrocarbon oil and a glycol ester, said ester being present in quantity sufficient only to prevent the initial formation of a hard gel-like structure in the grease.

10. A smooth, homogeneous grease comprising at least 5% of a lithium soap, a major proportion of a hydrocarbon oil and an ester of a diglycol, said ester being present in quantity sufficient only to prevent the initial formation of a hard gel-like structure in the grease.

11. A smooth, homogeneous grease comprising at least 5% of a lithium soap, a major proportion of a hydrocarbon oil and between about 0.2% and 2.0% of a diglycol stearate.

12. A smooth, homogeneous grease comprising at least 5% of a lithium soap, a major proportion of a hydrocarbon oil and an unsulfurized ester of glycerol, said ester being present in quantity sufficient only to prevent the initial formation of a hard gel-like structure in the grease.

13. A smooth, homogeneous grease comprising at least 10% of a lithium soap, a major proportion of a hydrocarbon oil and between about 0.2% and about 2.0% of glycerol mono-oleate.

14. A smooth, homogeneous grease comprising at least 10% of a lithium soap, a major proportion of a hydrocarbon oil and between about 0.2% and about 2.0% of pentaerythritol mono-oleate.

15. A grease having the following composition:

| | Percent by weight |
|---|---|
| Lithium stearate | 5–25 |
| Unsulfurized ester of a polyhydric alcohol | 0.2–2.0 |
| Hydrocarbon oil | 75–95 |

16. A grease having the following composition, in parts by weight:

| | |
|---|---|
| Lithium stearate | 15 |
| Diglycol stearate | 0.5 |
| Phenyl - alpha - naphthylamine | 0.15 |
| Hydrocarbon oil, viscosity 50–600 seconds Saybolt Universal at 100° F | 84.35 |

17. A process for the manufacture of a lubricating grease comprising preparing a composite of a lithium soap and a hydrocarbon oil containing at least 5% of lithium soap, adding to said composite between about 0.2% and about 2.0% of an ester of a polyhydric alcohol and a fatty acid at a temperature in the range of about 400 to about 440° F. and cooling said composite to a temperature of about 200° F. at an average rate of at least about 2° F. per minute.

18. The process of claim 17 wherein the ester is commercial diglycol stearate.

19. A lithium soap grease comprising at least 5% of lithium soaps of mixtures of saturated fatty acids, a major proportion of a hydrocarbon oil and between about 0.2% and about 2% of an unsulfurized ester of a polyhydric alcohol and an acid.

20. A lithium soap grease comprising at least 5% of lithium soaps of mixtures of saturated fatty acids, a major proportion of a hydrocarbon oil and between about 0.2% and about 2% of a partial ester of a polyhydric alcohol and an acid.

21. A process for the manufacture of lubricating grease comprising preparing a composite of a lithium soap and a hydrocarbon oil, said composite containing at least 5% of lithium soap, adding to said composite between about 0.2 and about 2% of an ester of a polyhydric alcohol and a fatty acid at a temperature in the range of about 400° F. to about 440° F. and cooling composite without agitation to a temperature of about 200° F. at an average rate of at least 2° F. per minute.

LAWRENCE C. BRUNSTRUM.
HUBERT J. LIEHE.